(12) United States Patent
Barron et al.

(10) Patent No.: US 8,522,042 B2
(45) Date of Patent: Aug. 27, 2013

(54) METHOD AND APPARATUS FOR ENFORCEMENT OF SOFTWARE LICENCE PROTECTION

(75) Inventors: Dwight L. Barron, Houston, TX (US); E David Neufeld, Houston, TX (US); Kevin M. Jones, Houston, TX (US); Jonathan Bradshaw, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1450 days.

(21) Appl. No.: 11/590,293

(22) Filed: Oct. 31, 2006

(65) Prior Publication Data

US 2008/0148400 A1    Jun. 19, 2008

(51) Int. Cl.
*H04L 29/06* (2006.01)

(52) U.S. Cl.
USPC ............................... 713/189; 726/26

(58) Field of Classification Search
USPC ............... 726/26, 24, 23; 713/2, 150, 165, 713/188, 189; 705/51, 59
See application file for complete search history.

(56) References Cited

U.S. PATENT DOCUMENTS

| | | | | |
|---|---|---|---|---|
| 5,943,421 | A  * | 8/1999 | Grabon | 380/269 |
| 6,343,280 | B2 * | 1/2002 | Clark | 705/55 |
| 6,449,709 | B1 * | 9/2002 | Gates | 712/202 |
| 6,847,948 | B1 * | 1/2005 | Paolini et al. | 705/56 |
| 7,039,814 | B2 * | 5/2006 | DaCosta | 713/189 |
| 7,353,281 | B2 * | 4/2008 | New et al. | 709/229 |
| 2005/0273629 | A1 * | 12/2005 | Abrams et al. | 713/189 |
| 2006/0195402 | A1 * | 8/2006 | Malina et al. | 705/50 |
| 2010/0017624 | A1 * | 1/2010 | Chan et al. | 713/190 |

* cited by examiner

*Primary Examiner* — Ali Abyaneh

(57) ABSTRACT

A method of enforcing software license protection in a computer system comprising; morphing the data prior to distribution, resulting in morphed data; wherein morphing of data is accomplished by applying a reversible morphing algorithm to modify data, wherein said reversible morphing algorithm is uniquely seeded and/or controlled with control information.

19 Claims, 11 Drawing Sheets

500
METHOD AND APPARATUS FOR ENFORCEMENT OF SOFTWARE LICENCE PROTECTION

This application is related to pending application Ser. No. 11/590,420 titled "Method and Apparatus for Removing Homogeneity From Execution Environment of Computing System" filed 31 Oct. 2007, and pending application Ser. No. 11/590,421, titled "Method end Apparatus for Protection of a Computer System From Malicious Code Attacks" filed 31 Oct. 2007.

BACKGROUND OF THE INVENTION

Background of the Invention

Viruses, Worms, and Buffer Overflow's may differ in how they propagate from system to system, but the ultimate goal of each is to inject some fragment of unauthorized machine instructions into a computer system for execution. The author of the unauthorized instruction is thus able to subvert the target computer system to their own agenda, for example further propagating the unauthorized code fragment, launching denial of service attacks on a third parties, harvesting secret information or executing a malicious payload. Having established a foothold in the system, the unauthorized code typically establishes a dialogue with higher level operating system functions. Once available, this rich set of functionality permits the unauthorized programmer access to a wide set of capabilities with which to further his or her cause. Although the unauthorized machine instructions may not cause actual damage to the system or attempt to circumvent security for ulterior motives, even seemingly benign code consumes system resources and affects compatibility of various programs therefore it can properly be termed "malicious code."

A common hardware architecture and the wide scale deployment of a small number of operating systems in the enterprise and personal computing space has resulted in large groups of computers that share common properties, the result is that a successful hardware architecture and operating system based attack is likely to be wildly successful once released into the enterprise or internet computing environment. In some notable cases the level of success has been such that the impact has extended to systems and activities not directly targeted. The traditional defense against this type of assault has focused on the development (and if necessary correction) of safe code, i.e. code that does not contain flaws which might be utilized to subvert a target system. In addition computer users in both the home and the enterprise computing environment have deployed firewalls in an effort to limit access to protected computing resources. Scanning technologies are deployed in both the firewall on Personal Computers and on enterprise class servers in an effort to identify unauthorized programs and to remove them before they can execute. Systems must be kept up to date with the latest patches installed to defend against newly discovered flaws and vulnerabilities. The final defense is to search for and remove systems that exhibited 'viral behavior'. In each case the defenses have been shown to be imperfect.

DETAILED DESCRIPTION OF THE PREFERRED EMBODIMENTS

Figure 1:
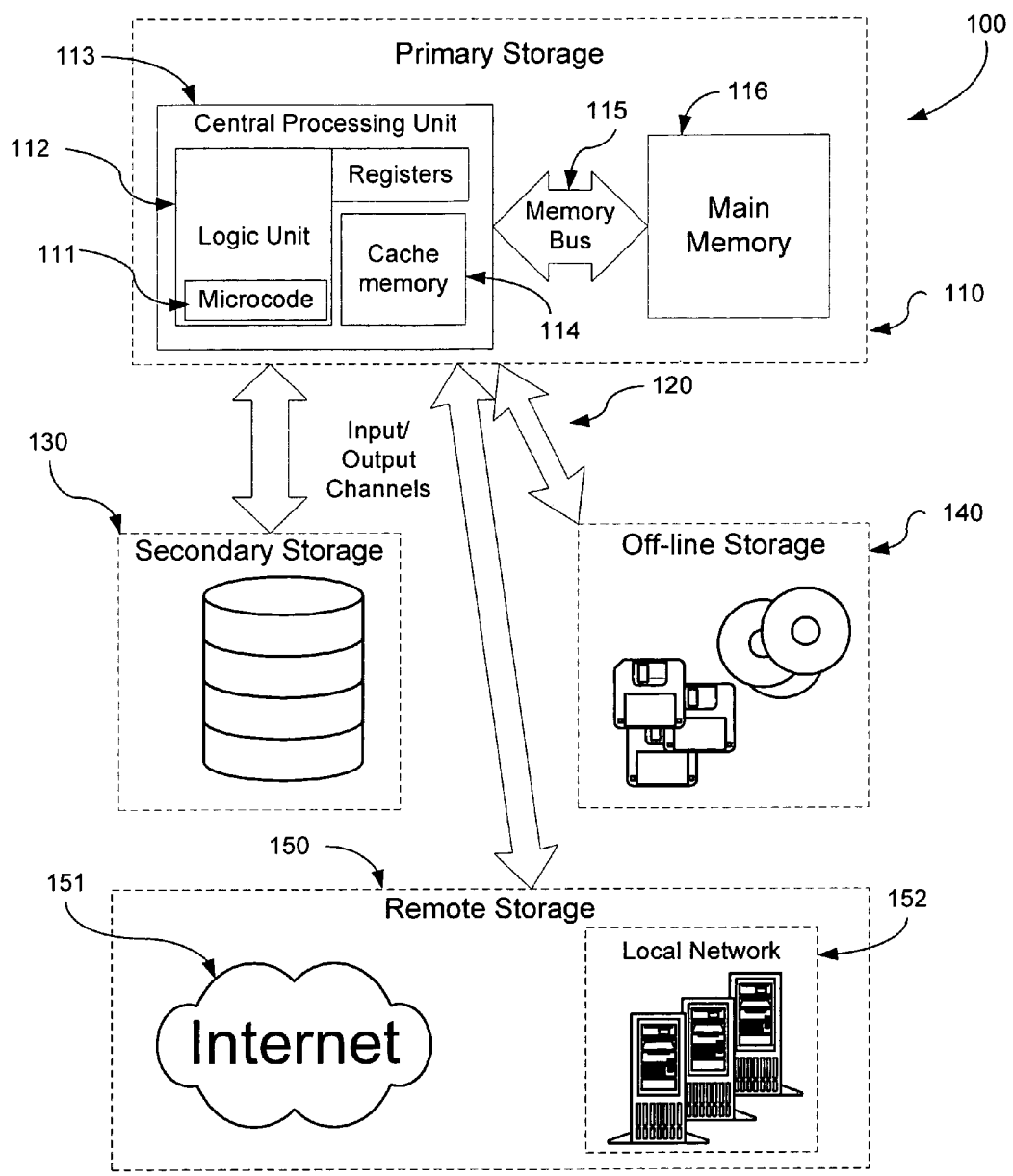
FIG. 1 illustrates a computing system in which Microcode which controls the Logic Unit of the Central Processing Unit is modified in accordance with an exemplary embodiment of the invention.

A typical embodiment of the present invention, by morphing the operating system and/or underlying hardware environment so that each system is sufficiently unique renders malicious code incapable of execution. Viruses replicate themselves by inserting a portion of undesirable code in a position of a trusted program such that the processor will eventually execute their code giving them the opportunity to execute their payload and further replicate themselves or preform other undesired actions. Manufacturers have attempted to provide means of uniquely identifying systems, motherboards, and even individual processors by means of a serial numbers or other unique identifiers. These unique properties can be used as a basis for modifying the computer system such that it does not have the homogeneity which aids propagation of malicious code. By modifying the data, programs, operating system and/or underlying hardware environment each system can be rendered sufficiently unique so as to be incapable of executing malicious code. Advances in computing over the past few years, especially in processor technology and systems implementation methodologies and storage capabilities, are sufficiently evolved to lend themselves to this approach.

Early processors used microcode to implement Operational Codes ("op-codes"). In later processor designs manufacturers began favoring hardwired instructions for their increased speed and cheaper implementation. Currently most processors implement a combination of the two. Simpler instructions are typically hardwired to provide faster execution, while more complex instructions, particularly newer instructions, are implemented in microcode. In most modern processors microcode is updatable. This means "newer" instructions, which may contain bugs at production, can be corrected or improved by a microcode update uploaded after the chip is manufactured and deployed.

Typical processors implement a few op-codes (in the low 100's) in an instruction space capable of holding many more op-codes (in the high 1000's). By shifting the op-code representations the processors can be rendered unique. In one embodiment this could be done by simply modifying the microcode, meaning, for example, an op-code 0305h, which may represent an ADD operation, could be offset to a new value of C8CAh. Programs then written and compiled for the native op-codes of the machine, which would as an example use 0305h to access an ADD operation, would no longer be able to execute on the modified processor because they would be unable to trigger a simple ADD operation. As code is loaded onto the machine, the op-codes would be shifted as well to align with the new op-codes present on the machine. Users could then select programs they know are safe from malicious code and morph them to run on the modified machine. Malicious code could no longer surreptitiously be inserted into a machine and executed. Execution would fail because 0305h may not point to any valid microcode instruction, causing a fault, or at the very least not cause the actions desired by the attacker. This embodiment can result in slower processing times because instructions which were previously hardwired for speed performance must now be executed through microcode. Also there is a higher implementation cost because Commercial Off The Shelf ("COTS") applications can no longer be loaded and run on the machine without undergoing a modification.

In a different embodiment, advances in computing, especially in processor technology and system implementation, are used to implement a similar protection mechanism in software adding more flexibility to the morphing stages without the performance decrease incurred by preempting hardwired instructions with microcode. This embodiment involves incorporating an un-morphing procedure as part of the fetch or pre-fetch operation. This embodiment would then perform morphing operations on segments of data, where the segment sizes are defined by the boundaries of memory being serviced (i.e. word size, cache line size, or segment size). Morphing code, as it is loaded into the computing system and storing it in this protected format ensures it can not effectively be infected with malicious code. The un-morphing procedure would convert the pre-morphed code in storage back to native code when it was loaded into the processor's internal cache. In the event malicious code is able to identify an access point and infect a morphed program, e.g. by dead reckoning an offset, the malicious code would still have been pre-morphed. Therefore the malicious code would be scrambled when passed through the de-morphing procedure, rendering it useless for the intended, purposes of the attacker.

In another embodiment instead of just morphing op-code the entire file can be morphed. This would be an effective means of protecting code which is stored in data form, such as the Visual Basic Script ("VB Script") or other $4^{th}$ Generation ("4GL") languages. This would also protect against virus infection of just-in-time ("JIT") compiled programs, or interpreted languages, i.e. HTML which also resides as "data" rather than as binary code in a system's storage. This can be accomplished by a morphing/de-morphing component employing algorithms which encrypt and decrypt the data ("cryption component") which employs a number of different algorithms. Algorithms can be as simple as a symmetric rotational algorithm, or more complex such as a public/private key encryption. Regardless of complexity, all algorithms and the keys applied should be protected and secured. Algorithms are selected on criteria of speed or security needed for the particular application being protected. Each file can have different algorithms or even multiple algorithms applied and specified along with the keys for that file. In a particular embodiment a method will allow the manipulation of algorithms such that new algorithms can be added to the crypto engine, and old algorithms can be removed. Prior to removal of algorithms, any applications encrypted by the algorithm should be decrypted and moved into memory using the algorithm to be removed and then re-encrypted and moved back to storage by a new algorithm. Failure to do so would result in the file no longer being accessible. In some instances this is exactly what a user may desire. So by removing from a system an algorithm or key used to encrypt a file will be an effective way of ensuring no part of an application can be executed on a particular machine. This may be useful in a situation where files are encrypted in a shared storage environment, and multiple processors access and run such files. Removal of the keys and/or algorithms from one or more of the machines would ensure the applications are not executable on the machines without affecting other machines which may still have need to execute the programs or process the data. In a different embodiment, the keys may not be stored on the machine, but may be supplied at execution time by the user, similar to prompting for a password or through biometrics. In another embodiment, keys may be supplied by a hardware device attached to the machine as a peripheral, such as a dongle, or smart card. In another embodiment, keys may be supplied by a remote system through a communications link, such as a modem or a network connection. In another embodiment, the remote system may be controlled by another entity such as a software supplier or vendor in connection with a licensing or pay-as-you-go service.

There are several ways the un-morphing procedure can be incorporated into the system. In one embodiment a crypto component may be incorporated as part of the processor core such that native code would exist only in an L1 cache. In another embodiment a crypto component may be incorporated as part of the processor core such that native code would exist only in the L1 and an L2 cache. In another embodiment a crypto component may be incorporated in the Memory Architecture Specific Integrated Circuit ("Memory ASIC") such that native code would exist only above a certain level in the primary memory components (or volatile memory). In another embodiment the crypto component may be a separate device connected to a system bus to which the processor can route data as necessary for cryption.

In each of the above embodiments the cryption components include processing logic which receives a key along with an address of the information to be moved and the direction of the move. This logic then encrypts information, moving from the processor, or decrypts information, moving to the processor. Thus, any information residing above a certain level of cache inside the system is in native format, and any information below the level of cache is in morphed format.

Cryptography keys (Keys) may be used for an entire program or uniquely associated with each segment of the program. While programs and data may share a common key, this is not as safe as using different keys for obvious reasons that it would make the program modifyable by anyone with access to the data. For the same reasons multiple programs on a system with the same keys can also reduce security of the system. Cryptography keys for purposes of this application can be assumed to also specify the algorithm to which they apply in implementations with multiple algorithms. In one embodiment on a system utilizing the x86 procssor architecture, keys can be stored in a modified version of the Page Table, or in a "Key Table" which shares common segment offsets with the Page Table. The key, regardless of storage in the Page Table or Key Table, is maintained in the same manner and at the same time as the Page Table. Thus, any time a far jump to a new segment causes the system to load a new segment into memory from a secondary storage device, the system would also fetch the keys for that segment. These keys could be stored in an encrypted form along with the data on the storage device, or could be part of a Trusted Platform Manager ("TPM") or other secure storage solution dependent on the level of security necessary on the machine. Regardless of where and how they are stored the keys would be made available to the crypto engine when a segment is loaded into memory. This means the processor can quickly access these keys when moving segments between Cache levels to crypt as necessary.

Cryption can be as simple as XOR-ing each word with a static symbol "key" or as complex as a public/private key encryption scheme. Since using a static key would leave the system vunerable to a statical anayisis, this method would yield only limited protection, but, limited protection may be all that is necessary in certain applications. The keys can be modified via a portion of the offset into the segment of each word. This would produce more of a "one-time pad" making statistical analysis almost useless. For additional security on a multi-user system the keys could be modified by a portion of data available only to a user such as a part of their password, or a value stored on a users smart card. If a program needs to be locked to a specific system, then Keys can be modified using system specific information, or even processor specific information (i.e. processor serial number). This results in a very secure and non portable solution which prevents theft. Though securing a program to a particular processor or system could also cause a problem with a rip and replace maintenance senario as well as preventing backup data from being restored to a new machine, this type of security may be warrented in some instances.

Code needs to be encrypted once and decrypted many times, but never again will it need to be encrypted because it does not change. So encryption keys for code can be a public/private key where the private key is used to encrypt the code then removed from the system, or never placed on the system (i.e. the encryption took place on an isolated trusted system then moved to the processing system). Or some sort of reverse hashing system can be employed. Data will need to be encrypted and decrypted on a system since data needs to be read, processed and written. So encryption keys should be provided which allow both. These may be another set of public/private keys where both are available to the processor, or simply a symmetrical key and algorithm.

Occasionally a system will have a program which may not be protected or need protection (one time execution of a program from a trusted source, or possibly an internal program with limited target potential.) This can be accomplished by associating a NULL key which triggers the cryption component to simply pass the data through without modification (i.e. applying a NULL algorithm, which does not modify the data). The ability to use NULL keys in a system means a system could unknowingly execute a program which has a virus. To protect against this scenario a flag can be designed into the processor to show its security status. This flag would be set to a "SECURE" setting when the processor first powers on. If data with a NULL key is ever moved through the cryption component this flag is set to the "TAINTED" setting. There is no way to re-secure a processor which has been tainted. Power cycling the system will flush out the entire cache ensuring no malicious code is "lurking" within, but if information was written to storage during the "TAINTED" operations, the entire system may still be compromised. The OS can test programs for associated NULL keys prior to loading and alert the user that executing the program will "TAINT" the system. This will give the user a chance to abort the program prior to loading. This alert may be of little use once a processor is already running in "TAINTED" mode, so the OS would monitor a flag to see if a system is already "TAINTED" and check user preferences to determine if the alert should be supressed.

FIG. 1 illustrates an exemplary system (100), where the Microcode (111) which controls the Logic Unit ("LU") (112) of the Central Processing Unit ("CPU") (113) has been modified to have different op-codes represent the operations than would be found in a standard Commercial Off-the-Shelf ("COTS") CPU, (i.e. one not developed for a specific purpose). Programs in this exemplary system should be morphed before they are moved across the Input/Output ("I/O") channels (120). Otherwise the programs in Cache Memory (114) and Main Memory (116) will not be executable. In this embodiment morphed programs would be stored in Secondary Storage (130) or Off-line Storage (140). This embodiment would limit programs from Remote Storage (150) which would be executable on the machine because of its unique Microcode (111). This is a benefit because malicious code usually comes through the Internet (151) or some other computer on the Local Network (152). This is also a detriment because shared programs can no longer be stored as a single copy on the Local Network (152) because each system would need a unique copy. What would seem an obvious workaround to this issue, to morph a program on a networked machine prior to transporting it across the network to the target machine, would mean the un-morphed program resides on the Local Network (112) in standard format, leaving it vulnerable to the malicious code.

Figure 2:
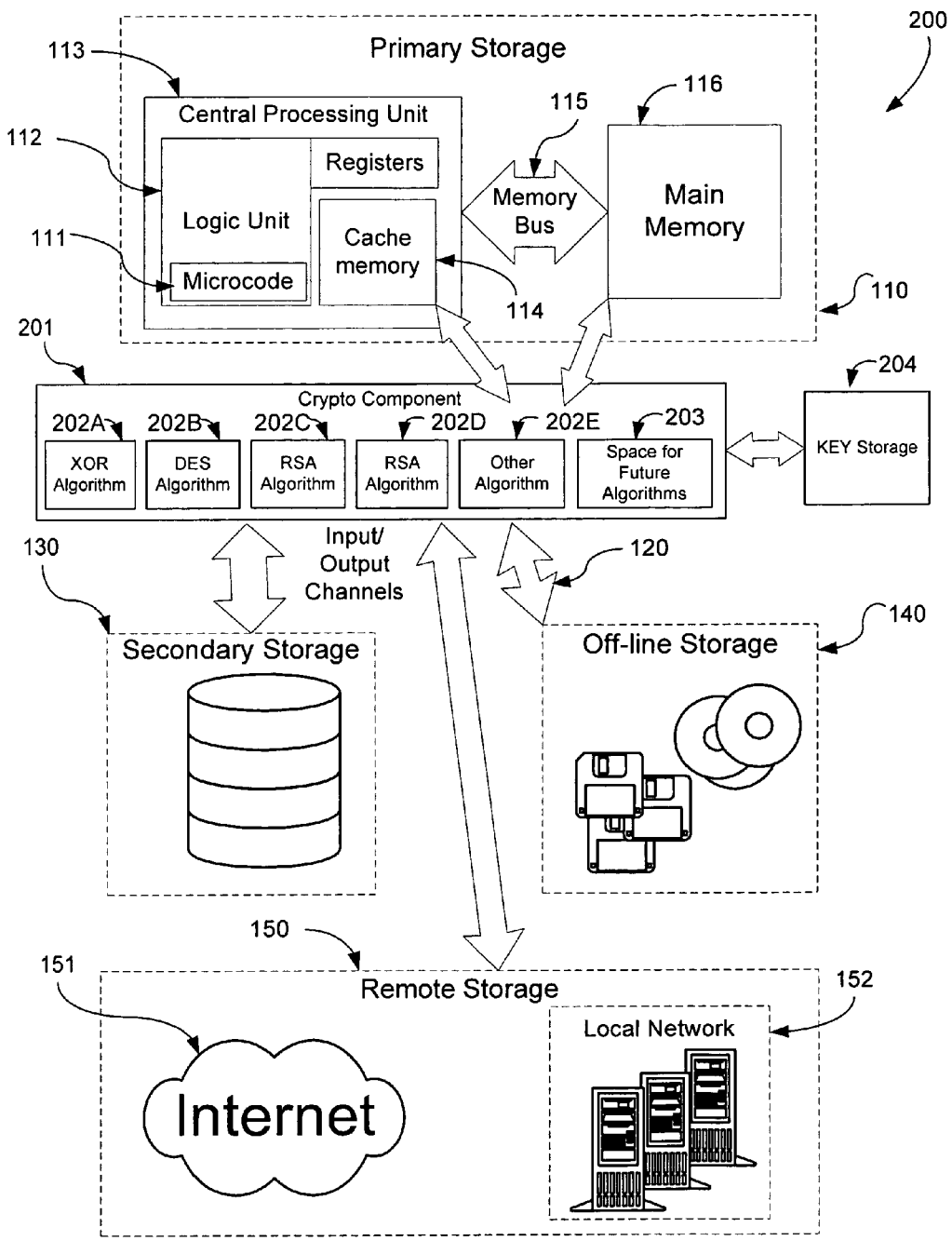
FIG. 2 illustrates a computing system with an encryption/decryption ("cryption") component in accordance with an exemplary embodiment of the invention.

FIG. 2 illustrates an exemplary system (200), where the Microcode (111) which controls the Logic Unit ("LU") (112) of the Central Processing Unit ("CPU") (113) has NOT been modified. It has the same op-codes representing the same operations as would be found in a COTS CPU. In a system, such as this, the programs residing in the Primary Storage (110) are un-morphed. Programs in this exemplary system would be stored in an encrypted or morphed form. In this embodiment there is a secure Key Storage (204) which is only accessible through the Cryption Component (201). Programs stored in the Secondary Storage (130) or Off-line Storage (140) would move across the Input/Output ("I/O") channels (120) into the Cryption Component (201) where data stored with the program would indicate which key to use for un-morphing. The Cryption component retrieves the Key from Key Storage (204) and any pertinent information from the CPU (113) used by the Algorithm (202A-E, 203) to un-morph the program prior to moving it to Main Memory (116). The process also operates to morph data when said data is moved in the reverse direction. This embodiment would not limit programs from Remote Storage (150) as described in the previous embodiment. Although malicious code usually comes through the Internet (151) or some other computer on the Local Network (152), there are times when it is desirable to still bring programs from these locations for execution despite the security risk. A single copy of a program can still be protected by being stored on the Local Network (152) in morphed form. In this case the appropriate Key would be deposited in the Key Storage (204) of each system so that the program could be un-morphed after transportation across the network. If a program which is not in morphed format needs to be executed on this machine, then it can be read in with a NULL key, which will instruct the Cryption Component (201) to move the program to Main Memory (116) without applying any of the security algorithms or morphing the program in any way.

Figure 3:
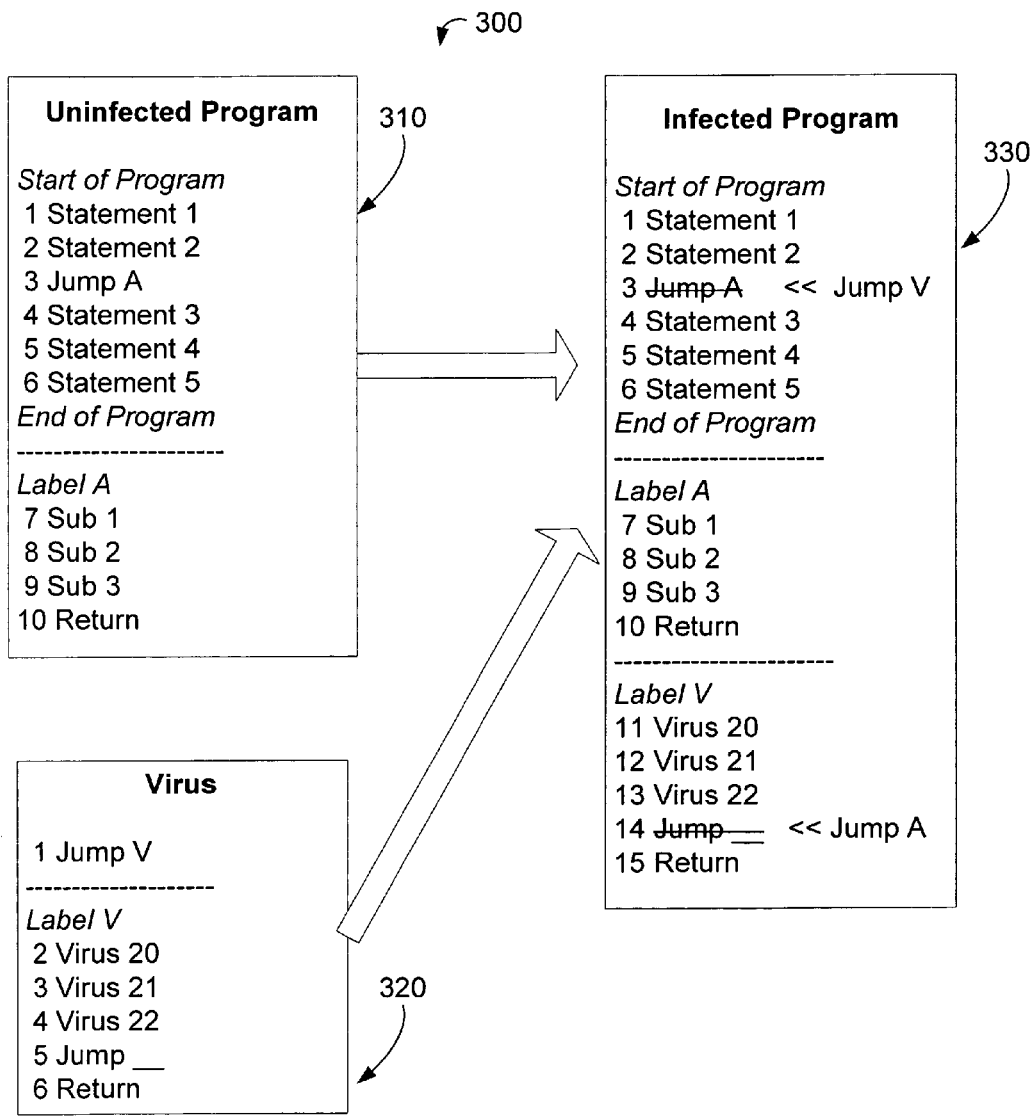
FIG. 3 illustrates a method by which a program can be infected by a virus exhibiting what is commonly known as jump point virus behavior.

FIG. 3 illustrates one method by which a program can be infected by a virus. This is often referred to as jump point virus behavior. An uninfected program (310) is targeted by a virus (320) resulting in an infected program (330). The virus will look for a Jump Statement in the uninfected program (310-line 3). This statement would normally divert program execution to the start of the subroutine (310-line 7~310-line 10) at Label A. If the virus were to simply insert its malicious code (320-line 2~320-line 4) then the infected program would quickly be spotted by an alert user and removed from the system. Instead a virus replaces the original jump statement with a new jump statement (330-line 3) which will divert program execution to the start of its own subroutine (330-line 11) at Label V which allows the malicious code (330-line 11~330-line 13) to execute. The virus then inserts the original jump statement (330-line 14) at the end of the malicious code to re-divert execution back to the intended subroutine (330-line 7~330-line 10) at Label A. In this manner the malicious code is executed and the user is never aware of the problem.

Figure 4:
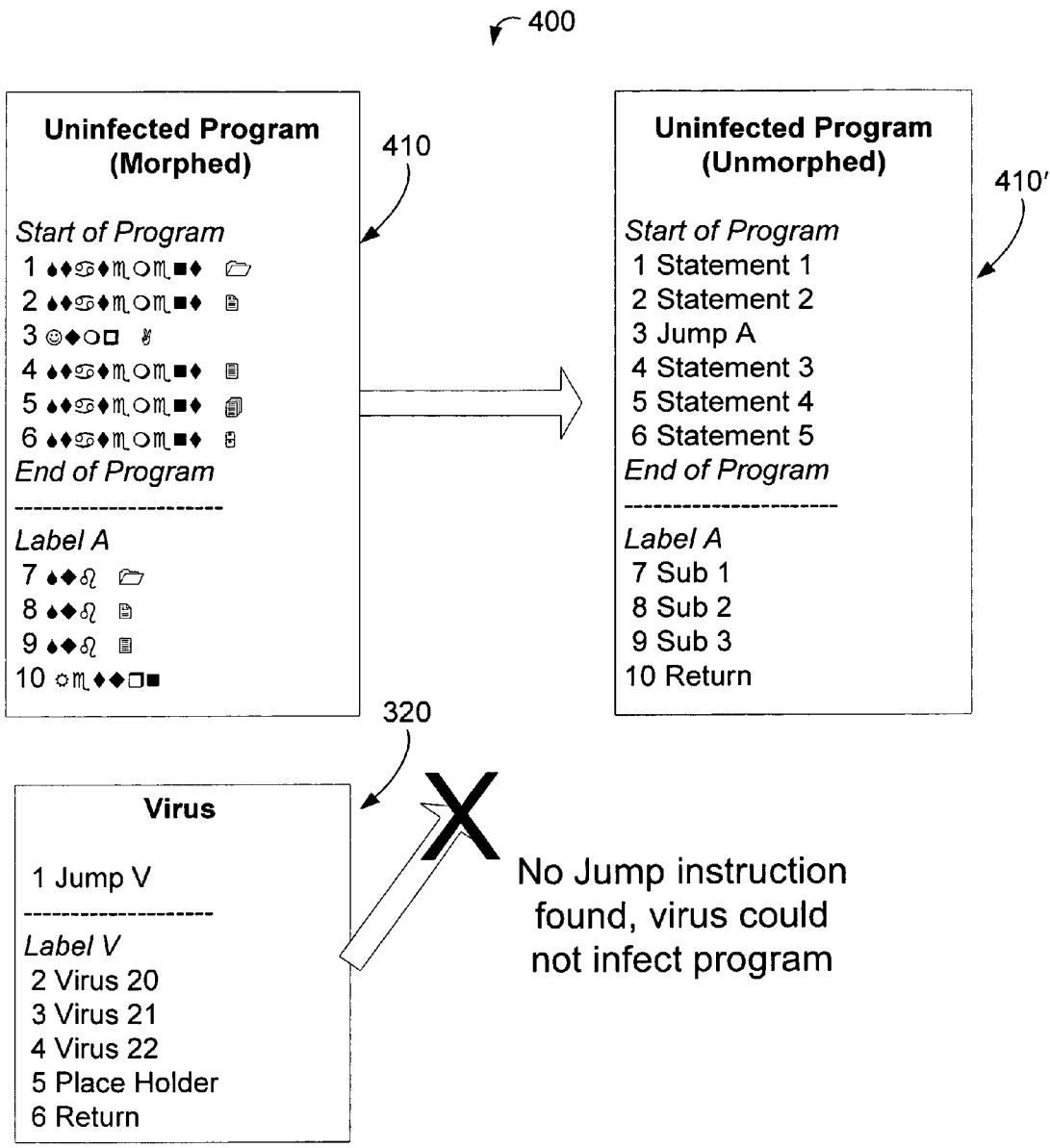
FIG. 4 illustrates a method by which a program can be infected by a virus exhibiting what is commonly known as entry point virus behavior.

FIG. 4 is exemplary of one method by which malicious code can be prevented on a protected system from infecting programs. An uninfected, morphed program (410) is targeted by the virus (320). The looks for a Jump statement (410-line 3) however due to morphing of the uninfected program it is unable to recognize the statement, so the program remains uninfected. Once the program is un-morphed (410'), it will execute as intended with no malicious code because the program execution continues normally.

Figure 5:
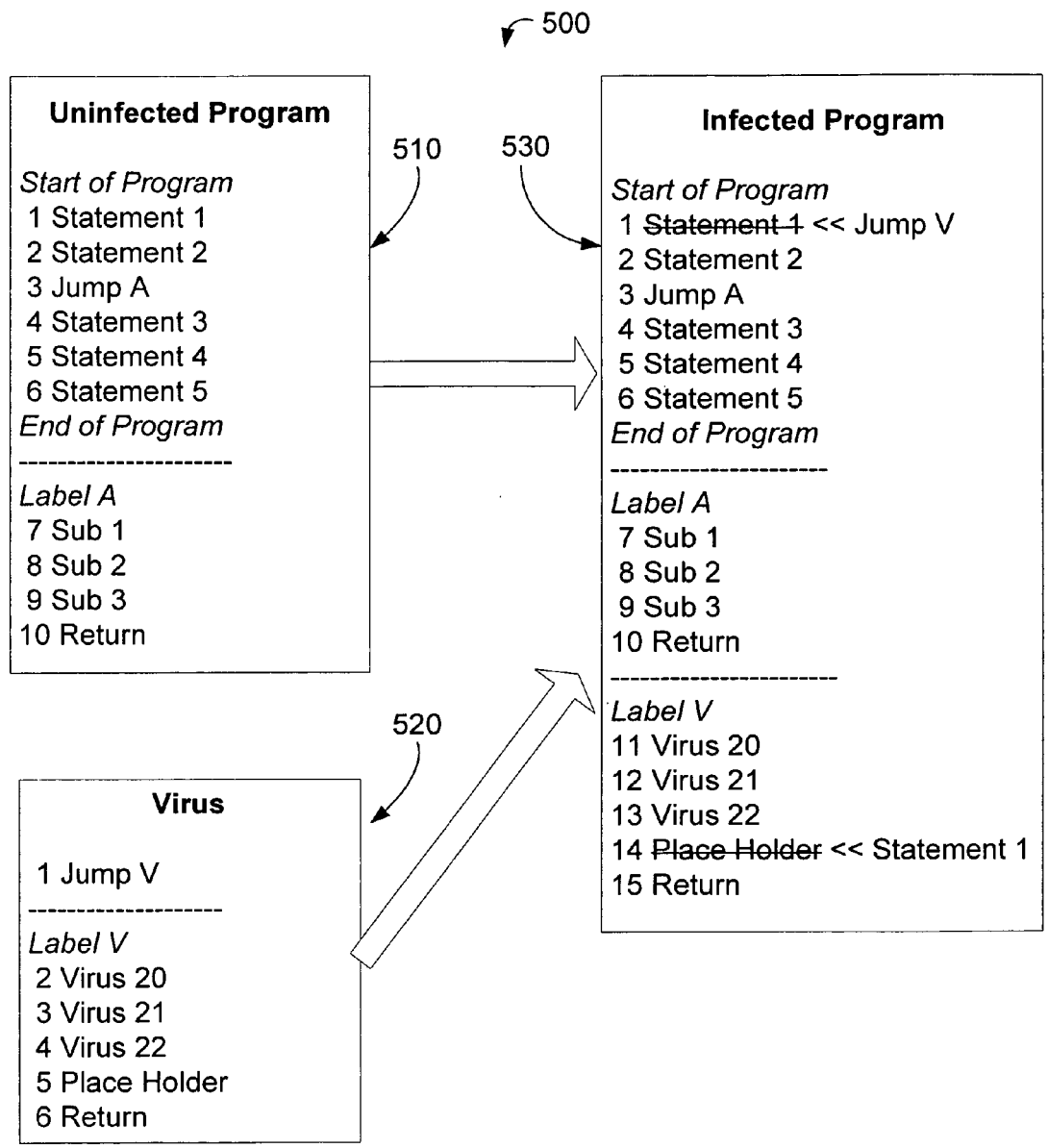
FIG. 5 illustrates a method by which a program can be protected from infection by a virus in accordance with an exemplary embodiment of the invention.

FIG. 5 illustrates another method by which a virus can infect a program referred to as entry point virus behavior. An uninfected program (510) is targeted by a virus (520) resulting in an infected program (530). The virus does not look for a particular statement to hijack in the uninfected program. Instead, the virus uses the entry point of the program as a point in which to gain access. A virus will always be able to find the entry point, because it must be a common well known point so that the Operating System ("OS") will be able to find it when the program is started. In this case, the virus replaces the first statement of the program (510-line 1) with a jump statement (530-line 1) which diverts program execution to the start of the subroutine (530-line 11~530-line 15) at Label V. The virus also contains a Placeholder (520-line 5) which is replaced with the normal first statement of the program (530-line 14). After this statement is executed, the subroutine returns (530-line 15) and program execution continues. If the first statement is smaller than the jump statement, then more than a single statement is moved to the end of the virus subroutine to make room for the jump statement. If the first statement is larger than the jump statement, then a single statement is moved to the end of the virus subroutine, and the jump statement is padded with NULL-Operations (no-op's) to fill the space. As previously mentioned, the virus cannot simply insert its malicious code (520-line 2~520-line 4) into the beginning of the target program because the statements displaced by the malicious code would be missed, the program would not start up normally and the user would be alerted to the problem, resulting in the program being removed from the system. In this manner the malicious code is executed and the user is never aware of the problem.

Figure 6:
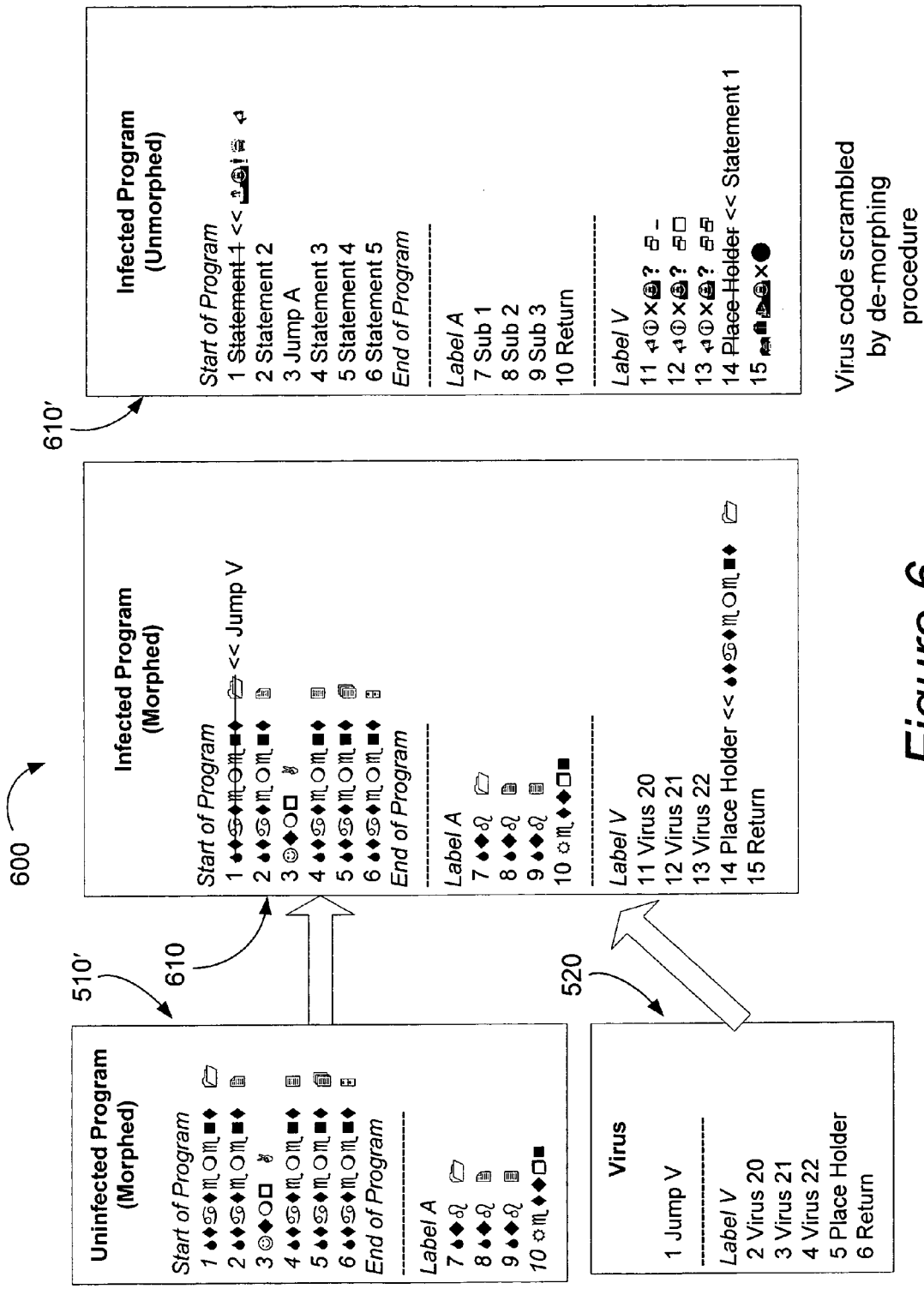
FIG. 6 illustrates another method by which a program can be protected from a virus in accordance with an exemplary embodiment of the invention.

FIG. 6 is exemplary of one method by which malicious code can be prevented on a protected system from infecting programs. An uninfected, morphed program (510') is targeted by the virus (520). Since the entry point of the program is a well known location, the virus is able to replace the first statement with its own Jump statement (610-line 1) and attach its malicious code to the program in the manner previously described. However, since the program (510') was morphed, and the virus was not, the infected program (610) is a conglomeration of morphed and un-morphed code. Once the program passes through the Cryption Component code from the program will be un-morphed back to executable code. However, the Cryption Component will have the opposite affect on the malicious code. What was previously executable code will be morphed into an un-executable mess which renders it ineffective for its malicious purposes. The resulting program (610') will likely not be executable, and may crash the system when execution is attempted, but this is usually more desirable than the original intended purposes of the malicious code.

The protection offered to programs by morphing can also be shared by data. A separate key should be assigned for data. Typically, the key associated with programs should only be able to de-morph the program, ensuring the program is never altered. In contrast, the data key is a two-way key which can be used for morphing and de-morphing. In computer systems separate addressable spaces for multiple programs are managed through a memory segmentation or paging system.

Figure 7:
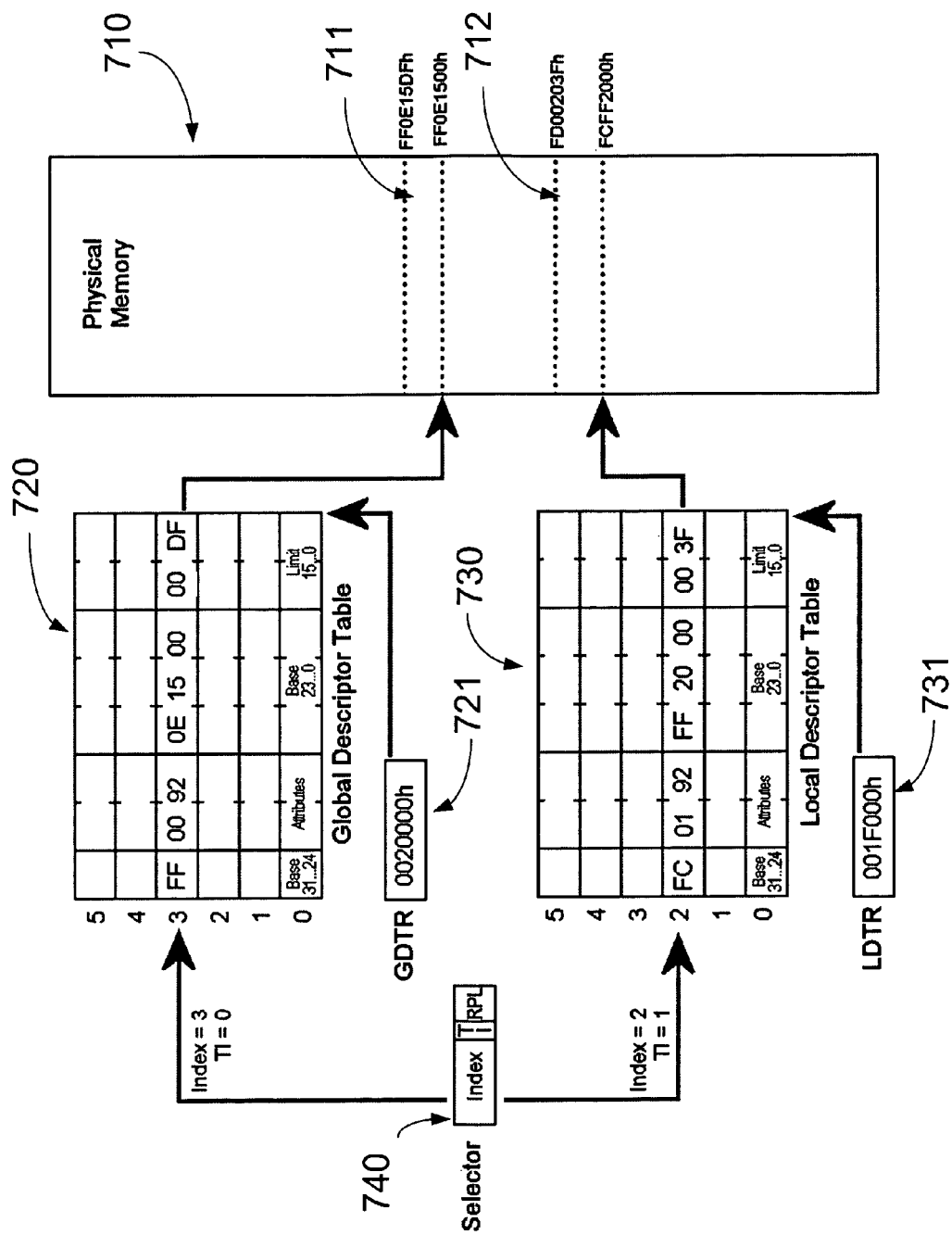
FIG. 7 illustrates a memory addressing system exemplary of that found in system employing the x86 processor architecture.

FIG. 7 illustrates a memory addressing system exemplary of that found in systems employing the x86 architecture. Physical memory (710) is divided into multiple blocks (two examples of which are identified as 711, 712). Blocks which are shared memory and kernel memory are described and tracked by the Global Descriptor Table ("GDT") (720) referenced by the Global Descriptor Table Register ("GDTR") (721) while user processes are described and tracked by a Local Descriptor Table ("LDT") (730) which is referenced by the Local Descriptor Table Register ("LDTR") (731). There can be unique LDT's (730) for each user process with LDT's being switched by the operating system during process scheduling. The GDT (720) is generally not switched. Blocks of physical memory (711, 712) are addressed through a selector (740) which specifies which table is referenced via a Table Index ("TI") and an index into that table. Each entry in the Descriptor Tables (720, 730) contain the physical memory base address, and a size limit, as well as attributes which govern how the memory may be used.

Figure 8:
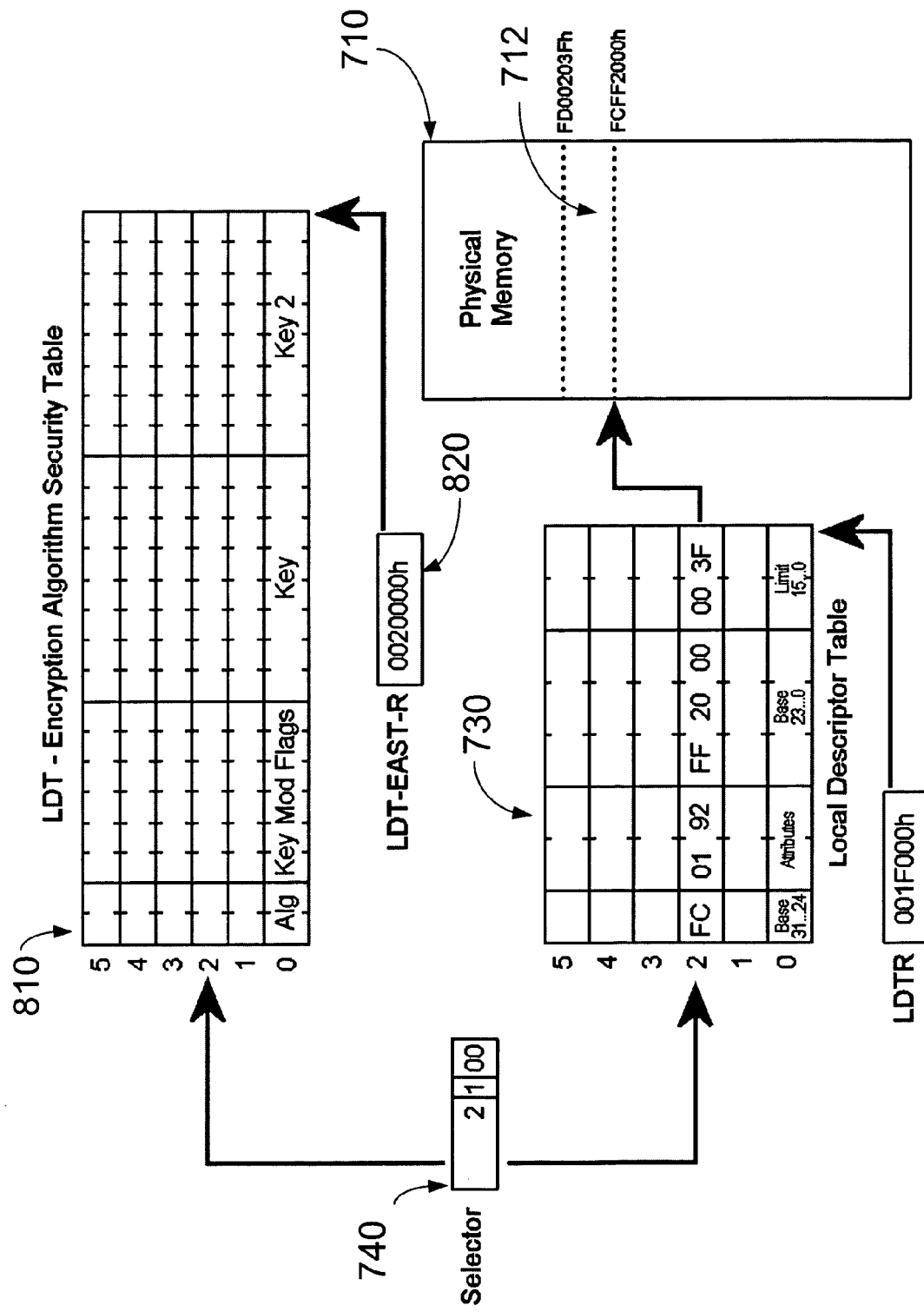
FIG. 8 illustrates a method by which the memory addressing system employed the x86 processor architecture may be enhanced in accordance with an exemplary embodiment of the invention.

FIG. 8 shows a method exemplary of the current invention where an additional table had been added to the memory addressing system shown in FIG. 7. The portion illustrated applies to the LDT for a single user process. Other user process, and the GDT would have similar implementations. An Encryption Algorithm Security Table ("EAST") (810) is associate with the LDT (730), and is used to track settings necessary for the correct morphing and de-morphing of code by the cryption component. The EAST (810) is referenced by the same selector (740) as the LDT (730), but has its own reference register (LDT-EAST-R) (820). This allows the EAST to be maintained in a separate memory block from the LDT and prevents the need for modification of the LDT support already implemented in the x86 platform. Each line in the LDT (730-1~730-5) would have a corresponding line in the LDT's associated EAST (810-1~810-5). By loading the EAST with the correct keys at the same time the LDT is loaded with the correct memory access information, the cryption component are assured timely access to the information necessary to morph or de-morph when the memory is accessed by the processor(s).

Figure 9:
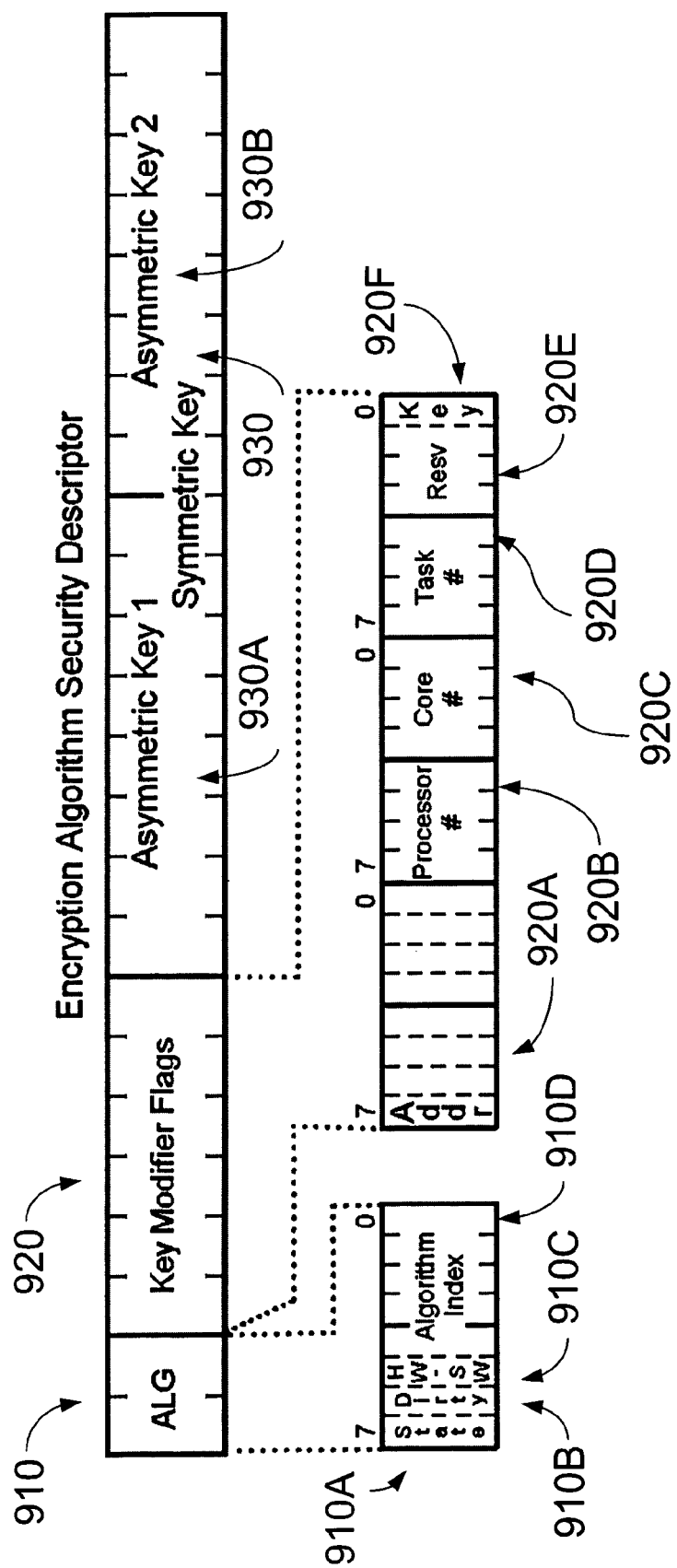
FIG. 9 illustrates a Encryption Algorithm Security Table in accordance with an exemplary embodiment of the invention.

FIG. 9 shows an exemplary entry in an EAST table. The EAST table has multiple entries, each of which contains the information necessary for the cryption component to properly morph or de-morph a memory block. Exemplary of this information is a Algorithm Sector (910) which comprises a State descriptor (910A) which tells if the memory's contents are currently morphed or de-morphed. A Dirty flag (910B) tells if the memory contents have been modified (other than un-morphing). If contents have not been modified, then when the information needs to be flushed from memory, it can simply be discarded, and later retrieved from storage. If the contents have been modified, then they will need to be written back to storage prior to flushing, and this operation may require morphing of the data for protection, if the key allows this operation to happen. Another part of the Algorithm Sector (910) is the Hardware/Software Flag (HW/SW) (910C) which indicated if the algorithm to be applied is one implemented in the hardware portion of the cryption component, or if it is a software algorithm which would be stored and accessed by the cryption component in a different fashion. The Algorithm Sector (910) also includes an Algorithm Index (910D) which allows for multiple HW and SW algorithms to be implemented in the cryption component. The EAST entry further comprises a sector which contains Key Modifier Flags (920). The Key Modifier Flags further modify the keys used in morphing and de-morphing such that the data is less predictable, or is limited to only be used by a particular machine, core, task, or processor, etc. By seeding the cryption algorithm by something variable, like the processor number, the cryption would yield improper results if morphing was attempted by a non-authorized processor. This type of seeding yields further protection by limiting cryption to certain machines or scenarios in which the data should be accessible. Examples of Key Modifier Flags include: an Address flag (920A), a Processor Number (920B), Core Number (920C), Task Numbers (920D) and others (920E). Another Sector found in an EAST table entry is the Key Sector (930). A field in the Key Modifier Flag Sector (920F) would indicate how this key is to be interpreted. It could be read as a single symmetric key occupying the entire sector (930), or it could be interpreted as two asymmetric keys (930A, 930B).

Figure 10:
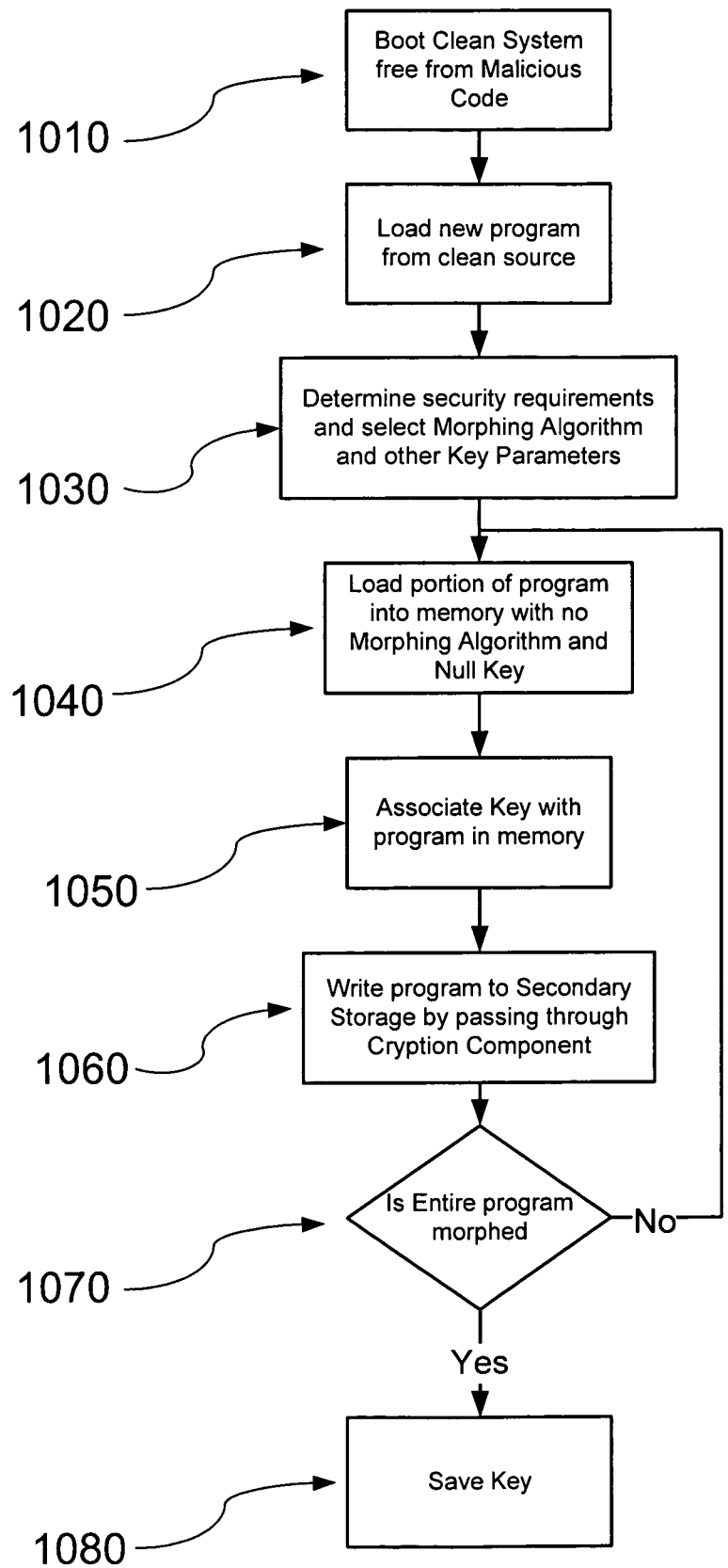
FIG. 10 is a flowchart illustrating the method by which a program can be morphed in accordance with an exemplary embodiment of the invention.

FIG. 10 is a flowchart exemplary of the current invention which illustrates how a program can be imported into the system a morphed, or de-morphed for movement to another system, or de-morphed and re-morphed under a different key. To ensure no malicious code can infect the target program during this operation it is important that the system be clean, that is free from malicious code (1010). This can be accomplished in a number of ways some of which are running up-to-date virus scans, loading a cleanly formatted system using only known clean software from trusted sources, or using software freshly compiled from trusted source code in a secure environment. A program which is known to be free from malicious code is loaded into the system's memory (1020). Security requirements are determined and a key is created (1030). This can be done automatically in the system by implementing default security settings, or can be selected/altered by a user during installation either directly, or through a utility program. A portion of the program is read into memory with the current key, or a null key if the program is currently un-morphed (1040). The result is a clear, un-morphed portion of the code in the systems physical memory. The un-morphed program in physical memory is then associated with the new key (1050) and the program is written to secondary memory passing through the cryption component as necessary (1060). If the entire program is not complete (1070) the process continues with the next portion of the program being loaded into memory (1040). Once the entire program is complete, the keys are saved (1080). In another embodiment a software development system, which normally compiles source code into natively executable binary code can be modified to compile the source code directly into a morphed executable binary.

Figure 11:
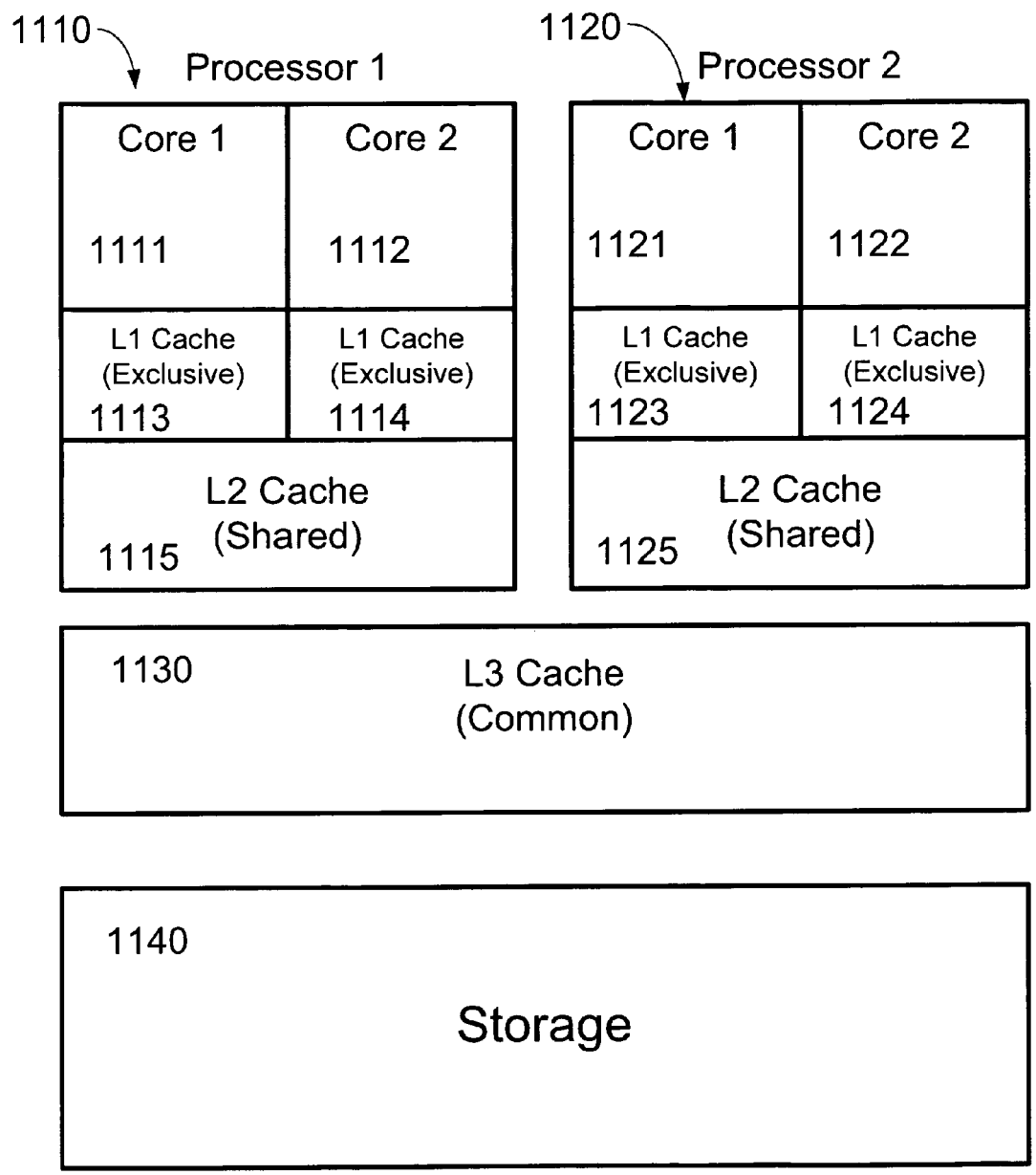
FIG. 11 illustrates a multi-core, multi-processor system in accordance with an exemplary embodiment of the invention.

FIG. 11 illustrates a multi-core/multi-processor environment. In the illustrated system there are a plurality of processors (1110, 1120) each having a plurality of processing cores (1111, 1112, 1121, 1122). Each core has its own L1 Cache (1113, 1114, 1123, 1124), and each processor has its own L2 Cache (1115, 1125) which is shared between the cores of the particular processor. The exemplary system illustrated has a single L3 Cache (1130) which is common to all processors. Storage (1140) is shown as a single unit for simplicity but can consist of on-line storage, off-line storage, remote networked storage, or the internet as illustrated in previous figures. An exemplary embodiment of the current invention may have the cryption component placed between the L3 Cache (1130) and storage (1140), which would mean all data (program code and process data) above the cryption component (i.e. closer to the processor cores) would be un-morphed, and all data below the cryption component (i.e. farther away from the processor cores) would be morphed. Other embodiments may place the cryption component between the L2 Cache (1115, 1125) and the L3 Cache (1130) resulting in morphed code being present in the L3 Cache. In this embodiment, any data which would need to pass from Processor 1-Core 1 (1111) to Processor 2-Core 2 (1122) would need to be morphed when moved from Processor 1's L2 Cache (1115) to L3 Cache (1130) and then de-morphed when moved from L3 Cache (1130) to Processor 2's L2 Cache (1125). This results in a slower data transfer, but yields a higher degree of protection. This protection could be further increased by another embodiment, exemplary of the current invention which places multiple cryption components in the system such that each L2 Cache (1115, 1125) has its own unique cryption components which may or may not share a common key storage area. This embodiment could be used to further limit applications to only be de-morphed for execution on a particular processor in a multi-processor environment. Carried further, in another embodiment, unique cryption components, with unique key storages areas can be placed between the L1 Cache (1113) and L2 Cache (1115) of a core (1111) core in a multi-core processor (1110). In this scenario data could no longer be shared between cores (1111, 1112) without first being morphed to move it to a common area, L2 Cache (1115) then de-morphed when moved to the L1 Cache of the other core. Note that this is different from the protection offered by the Processor Number (920B) and Core Number (920C) in the Key Modifier Flags (920) of the Encryption Algorithm Security Descriptor. The Processor Number and Core Number only ensure the proper processor and/or core is the one fetching the data into memory. Once the data is de-morphed into memory, that data is in "native" format and can be modified by any processor, core, or process which has access to the memory.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory (such as memory of the handheld portable electronic device) and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of enforcing protection of a software license, comprising;
    receiving, at a remote computer system controlled by a first entity, from a primary computer system controlled by a second entity in connection with a software licensing service, code that has been morphed and is in data form prior to distribution,
        wherein the code is a program subject to the software license,
        wherein the code has been morphed by application of a reversible morphing procedure to modify an entire file of the code, and
        wherein the reversible morphing algorithm is uniquely seeded with control information associated with the remote computer system;
    receiving, at the remote computer system, a key supplied by the primary computing system through the communication link; and
    incorporating, at the remote computer system, an un-morphing procedure as part of a pre-fetch operation by the remote computer system to be executed as the morphed file of code stored in data form is loaded into a processor internal cache of the remote computer system
    wherein incorporating the un-morphing procedure includes incorporating a crypto component as part of a processor core such that native code exists only in an L1 cache and morphed data exists in L2 and L3 caches.

2. A method, as described in claim 1, wherein control information comprises information unique to the remote computer system.

3. A method, as described in claim 1 wherein control information comprises information unique to a processor in the remote computer system.

4. A method, as described in claim 1 wherein control information comprises information supplied by a software supplier at time of sale, the second entity being the software supplier.

5. A method, as described in claim 1 wherein control information comprises information supplied by a software supplier at time of execution, the second entity being the software supplier.

6. A method, as described in claim 5 wherein control information is supplied by hardware peripheral device attached to the remote computer system.

7. A method, as described in claim 5 wherein control information is supplied by a remote computer system user.

8. A method, as described in claim 5 wherein control information is supplied by a software supplier, the second entity being the software supplier.

9. A method, as described in claim 8 wherein control information is supplied by a software supplier through a remote data connection, the second entity being the software supplier.

10. A method, as described in claim 1 wherein receiving, at a remote computer system includes loading the morphed data stored on electrical or optical media to the remote computer system.

11. A method, as described in claim 1 wherein receiving, at a remote computer system includes receiving the morphed data through a remote data connection.

12. A method, as described in claim 1 further comprising:
    receiving, to the crypto component, the key along with an address of the morphed file of code to be moved and a direction of the move;
    decrypting information moving to a processor; and
    encrypting information moving from the processor.

13. A method, as described in claim 1 further comprising using the key for executing the un-morphing procedure with respect to the entire file of the code.

14. A method, as described in claim 1 further comprising using the key uniquely for executed the un-morphing procedure with respect to a particular segment of the entire file of the code.

15. A method, as described in claim 1 further comprising:
    receiving, at the remote computer system, a plurality of keys supplied by the primary computing system through the communication link; and
    determining which of the plurality of keys to use during execution of the un-morphing procedure based on data stored with the morphed file of code stored in data form.

16. A method of enforcing protection of a software license, comprising;
    receiving morphed data of a reversible morphing procedure corresponding to an entire file of code, the code being a program subject to the software license,
        wherein the reversible morphing procedure is uniquely seeded with control information;
    storing the morphed data on a computer system; and
    de-morphing morphed data as part of an operation whereby the morphed data is moved from a first one of a processor's internal cache memory to a second one of the processor's internal cache memory prior to processing by the processor, resulting in de-morphed data being stored in the second one of the processor's internal cache memory,
    wherein incorporating the un-morphing procedure includes incorporating a crypto component as part of a processor core such that native code exists only in an L1 and morphed data exists in an L3 cache.

17. A method, as described in claim 1 wherein incorporating the un-morphing procedure includes incorporating a crypto component as part of a processor core such that native code exists only in an L1 and an L2 cache and morphed data exists in an L3 cache.

18. A method, as described in claim 16 wherein incorporating the un-morphing procedure includes incorporating a crypto component as part of a processor core such that native code exists only in an L1 cache and morphed data exists in an L2 cache and an L3 cache.

19. A method of enforcing protection of a software license, comprising:

receiving, at a remote computer system controlled by a first entity, from a primary computer system controlled by a second entity in connection with a software licensing service, code that has been morphed and is in data form prior to distribution, wherein the code is a program subject to the software license, wherein the code has been morphed by application of a reversible morphing procedure to modify an entire file of the code, and wherein the reversible morphing algorithm is uniquely seeded with control information associated with the remote computer system;

receiving, at the remote computer system, a key supplied by the primary computing system through the communication link; and incorporating, at the remote computer system, an un-morphing procedure as part of a pre-fetch operation by the remote computer system to be executed as the morphed file of code stored in data form is loaded into a processor internal cache of the remote computer system, wherein incorporating the un-morphing procedure includes incorporating a crypto component as part of a processor core such that native code exists only in an L1 cache and an L2 cache and morphed data exists in an L3 cache.

\* \* \* \* \*

UNITED STATES PATENT AND TRADEMARK OFFICE
CERTIFICATE OF CORRECTION

PATENT NO. : 8,522,042 B2
APPLICATION NO. : 11/590293
DATED : August 27, 2013
INVENTOR(S) : Dwight L. Barron et al.

Page 1 of 1

It is certified that error appears in the above-identified patent and that said Letters Patent is hereby corrected as shown below:

In the Claims

In column 11, line 57, in Claim 1, delete "system" and insert -- system, --, therefor.

In column 13, line 1, in Claim 17, delete "claim 1" and insert -- claim 16 --, therefor.

Signed and Sealed this
Fifth Day of November, 2013

Teresa Stanek Rea
*Deputy Director of the United States Patent and Trademark Office*